United States Patent
Ku

(10) Patent No.: US 7,057,363 B2
(45) Date of Patent: Jun. 6, 2006

(54) CIRCUIT FOR FAN MOTOR

(75) Inventor: Chin-Long Ku, Tu-Cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 0 days.

(21) Appl. No.: 11/069,147

(22) Filed: Mar. 1, 2005

(65) Prior Publication Data

US 2006/0049786 A1   Mar. 9, 2006

(30) Foreign Application Priority Data

Sep. 3, 2004   (CN) .......................... 200420043616

(51) Int. Cl.
*H20P 7/00*   (2006.01)

(52) U.S. Cl. .................. 318/268; 318/432; 318/721
(58) Field of Classification Search ............... 318/268, 318/432, 721
See application file for complete search history.

(56) References Cited

U.S. PATENT DOCUMENTS

| | | | | |
|---|---|---|---|---|
| 3,767,978 A | * | 10/1973 | Wemli ........................ | 361/175 |
| 4,355,237 A | * | 10/1982 | Harris, Jr. ................... | 250/551 |
| 4,369,371 A | * | 1/1983 | Hara et al. .................. | 250/551 |
| 4,568,838 A | * | 2/1986 | Honda et al. ............... | 327/487 |
| 5,043,587 A | * | 8/1991 | Miki et al. .................. | 250/551 |
| 5,703,459 A | * | 12/1997 | Yasohara et al. ............ | 318/808 |
| 5,726,881 A | * | 3/1998 | Inaniwa et al. .............. | 700/79 |
| 6,112,546 A | * | 9/2000 | Kim ............................ | 62/440 |
| 6,204,627 B1 | * | 3/2001 | Watanabe et al. ........... | 318/729 |
| 6,744,229 B1 | | 6/2004 | Horng et al. ................ | 318/254 |

* cited by examiner

*Primary Examiner*—Rita Leykin
(74) *Attorney, Agent, or Firm*—Morris Manning & Martin; Tim Tingkang Xia, Esq.

(57) ABSTRACT

A circuit (10) for a fan motor comprises a driver circuit (12) having an FG terminal which is able to output a first signal carrying speed information of the fan motor, a photo coupler (142) connected to the FG terminal to receive the first signal, the first signal being convertible by the photo coupler to a second signal carrying the same speed information, and a speed detection circuit (16) connected to the photo coupler to recognize the speed information by detecting the second signal.

16 Claims, 1 Drawing Sheet

CIRCUIT FOR FAN MOTOR

TECHNICAL FEILD

The present invention relates generally to fan motors, and more particularly to a detect circuit for the fan motor.

BACKGROUND

Cooling fans which are driven by brushless direct current motors (DC motor) are widely used in thermal management of a variety of electronic systems.

FIG. 2 schematically shows a control circuit of such a DC motor. The control circuit comprises a driver IC with winding coils L1, L2 of the DC motor connected thereto. A Hall effect sensor module (not shown) and a control module (not shown) are built into the driver IC. The Hall effect sensor is adapted to detect changes in the magnetic field of a permanent magnet of a rotor of the DC motor, and the driver IC amplifies the weak Hall voltage signal. Two output terminals O1 and O2 of the driver IC then alternatively output electrical current to the winding coils L1, L2 so that the winding coils L1, L2 are excited to drive the rotor to rotate.

Often, the rotational speed of the fan needs to be detected and regulated to achieve appropriate cooling fan speed. To detect the fan speed, the driver IC has a frequency generation (FG) output terminal predetermined as a rotation detection terminal. The output wave of the FG terminal is a series of square waves carrying the speed information that consists of a plurality of alternating high and low voltage signals. The high voltage shown by the output wave of the FG terminal is usually designed to be close or equal to that of the power source Vcc. A frequency of the square waves reflects the fan speed. During assembly of the motor, the FG terminal is connected to a speed detection circuit. This detection circuit is able to recognize the high or low voltage signal and therefore detect the fan speed.

In general, the FG terminal is reserved and exposed to facilitate assembly of the motor. However, during assembly thereof, the FG terminal may possibly contact with a human body. Discharge breakdown will likely occur through the FG terminal because the human body may carry considerable static electricity. Thus, the driver IC of the motor is prone to be damaged by the static electricity.

For the foregoing reasons, there is a need for a detection circuit which can avoid damage caused by static electricity of the human body.

SUMMARY OF THE INVENTION

The present invention is directed to a circuit which is capable of safely detect the speed of a fan motor.

A circuit for a fan motor comprises a driver circuit having a frequency generation output terminal which is able to output a first signal carrying speed information of the fan motor, a photo coupler connected to the frequency generation output terminal to receive the first signal, the first signal being convertible by the photo coupler to a second signal carrying the same speed information, and a speed detection circuit connected to the photo coupler to recognize the speed information by detecting the second signal.

Other objects, advantages and novel features of the present invention will be drawn from the following detailed description of the preferred embodiments of the present invention with attached drawings, in which:

DESCRIPTION OF PREFERRED EMBODIMENTS

Figure 1:
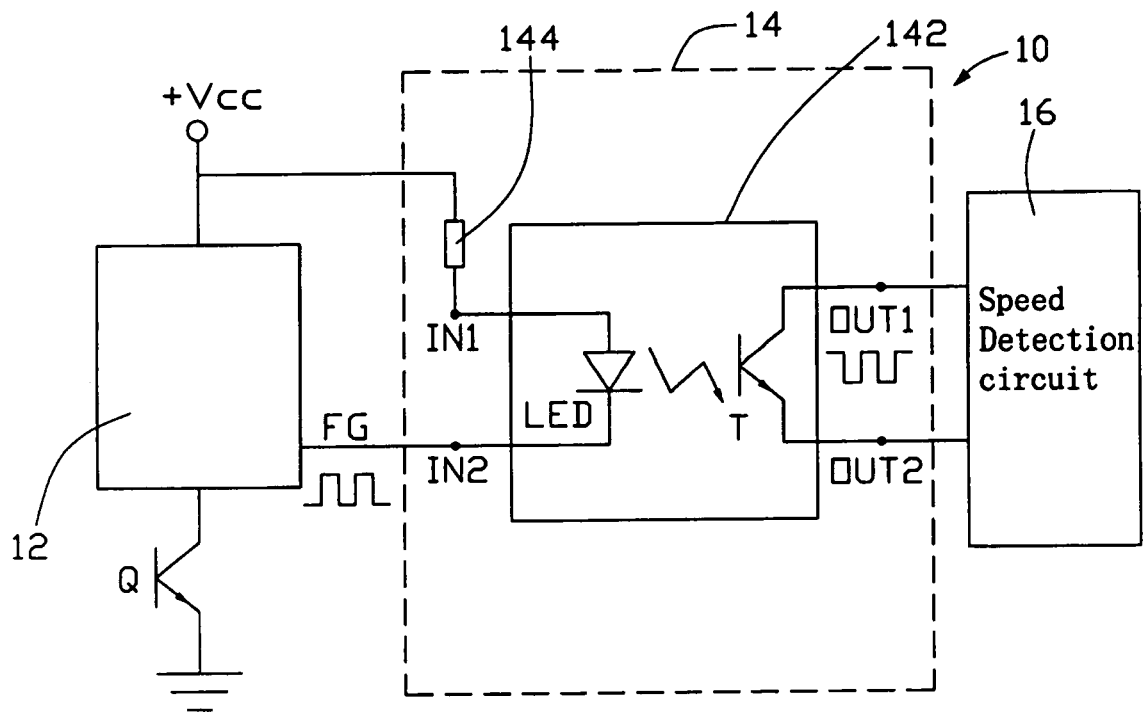
FIG. 1 is a circuit diagram of a driver circuit according to the present invention.
Figure 2:
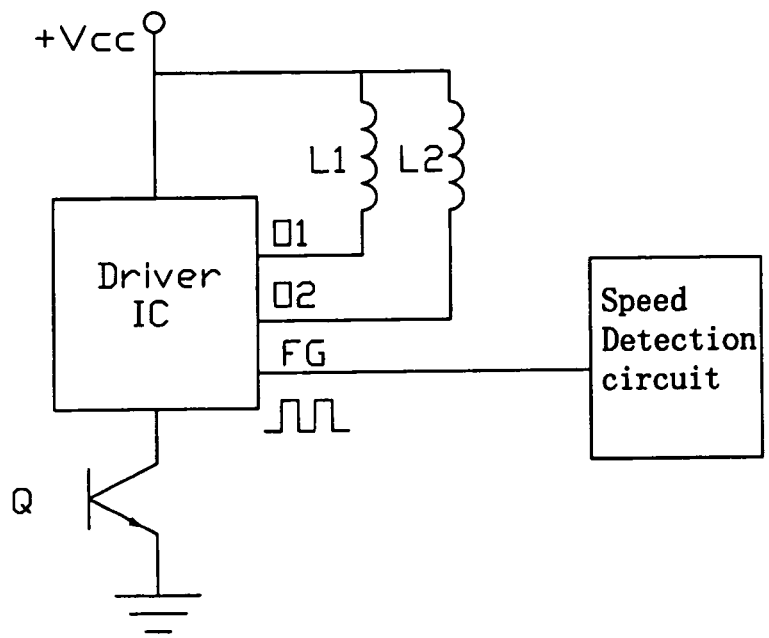
FIG. 2 is a circuit diagram of a conventional driver circuit of a fan motor.

FIG. 1 shows a circuit 10 for detecting a speed of a fan motor. The circuit 10 comprises a driver circuit 12 having a frequency generation (FG) output terminal, a convert circuit 14 receiving the output signal of the FG terminal, and a speed detection circuit 16 connected to the convert circuit 14.

The convert circuit 14 comprises a photo coupler 142 and a resistor 144 electrically connected to the photo coupler 142. The photo coupler 142 is a single package that combines an LED (Light Emitting Diode) and a phototransistor T electrically isolated from the LED. Two ends of the LED, i.e., the anode and cathode thereof, serve as input ends of the photo coupler 142. One end at the anode of the LED is designated as IN1, and the other end at the cathode of the LED is designated as IN2. Two ends of the phototransistor T, i.e., the emitter and collector thereof, serve as output ends of the photo coupler 142. The output ends are designated as OUT1 and OUT2. Once a forward bias is applied to the input ends of the photo coupler 142, which means the voltage level of IN1 is higher than that of IN2, the LED turns on and emits, the phototransistor T receives the light of the LED and thereby turns on. Once a reverse bias is applied to the input ends of the photo coupler 142, which means the voltage level of IN1 is lower than that of IN2, the LED goes to a cut-off state and does not emit. As a result, the phototransistor T goes to a cut-off state, too. A speed detection circuit 16 is connected to the output ends of the photo coupler 142.

IN2 of the photo coupler 142 is connected directly to the FG terminal of the driver circuit 12. A resistor 144 is connected between the power source Vcc and IN1 of the photo coupler 142. The value of the resistor 144 is selected so as to ensure that the electrical current flowing through the LED does not exceed the maximum allowable current of the LED when the LED turns on. This can protect the LED from being damaged.

In operation of the circuit, the driver circuit 12 outputs a series of high and low voltage through the FG terminal thereof. Because the anode of the LED is connected to the power source Vcc via the resistor 144, the anode of the LED is always disposed at a high voltage level.

If the output voltage of the FG terminal is high, no forward bias is applied to the LED. The LED therefore does not emit. The phototransistor T stays in a cut-off state and outputs a low voltage signal through OUT1 and OUT2 to the speed detection circuit 16.

If the output voltage of the FG terminal is low, a forward bias is applied to the LED. The LED therefore emits to cause the phototransistor T to turn on. The phototransistor T thus outputs a high voltage signal to the speed detection circuit 16. As a result, during operation, the phototransistor T outputs through OUT1 and OUT2 a series of square waves, which have a same frequency with the square waves outputting from the FG terminal, to the speed detection circuit 16. Therefore, the speed detection circuit 16 can detect the speed of the fan speed by detecting the frequency of the square waves of the output of the phototransistor T.

In the present invention, the output signal of FG terminal which carries the speed information of the fan is transmitted to the LED, and is further transmitted to the phototransistor T. Since the LED controls the phototransistor T via light, an electrically insulating interface is formed between the LED and the phototransistor T. Electrical signals at the input ends and output ends of the photo coupler 142 are totally electrically isolated. This can greatly reduce the frequency distortion caused by interior or exterior electrical noise signals and therefore improve the correctness of the speed detection result. In addition, even if the human body that carry static electricity contacts the output ends of the photo coupler 142, discharge breakdown will not occur through the output ends of the photo coupler 142 into the driver circuit 12, because the electrical signal cannot be transmitted from the phototransistor T to the LED.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A circuit for a fan motor, the circuit comprising:
   a driver circuit having a frequency generation output terminal which is able to output a first signal carrying speed information of the fan motor;
   a photo coupler connected to the frequency generation output terminal to receive the first signal, the first signal being convertible by the photo coupler to a second signal carrying the same speed information; and
   a speed detection circuit connected to the photo coupler to recognize the speed information by detecting the second signal.

2. The circuit as described in claim 1, wherein the photo coupler comprises an LED and a phototransistor electrically isolated from the LED.

3. The circuit as described in claim 2, wherein one of the anode and cathode of the LED is connected to the frequency generation output terminal, and the other of the anode and cathode of the LED is connected to a power source via a resistor.

4. The circuit as described in claim 2, wherein the emitter and collector of the phototransistor are connected to the detection circuit.

5. The circuit as described in claim 1, wherein the first and second signals are a series of square waves having a same frequency.

6. A method of detecting speed of a brushless direct current motor, the method comprising the steps of:
   obtaining a first signal which carries the speed information of the motor;
   converting the first signal to a second signal carrying the same speed information; and
   inputting the second signal to a speed detection circuit to recognize the speed information.

7. The method as described in claim 6, wherein the first signal is converted to the second signal through an electrically insulating interface.

8. The method as described in claim 7, wherein the electrically insulating interface is formed by a photo coupler.

9. The method as described in claim 6, wherein the first and second signals are a series of square waves having a same frequency, and the frequency of the waves reflects the speed of the motor.

10. The method as described in claim 6, wherein the first signal is output by a frequency generation output terminal of a driver circuit of the motor.

11. The method as described in claim 6, wherein the motor is a fan motor.

12. A method for transmitting signals in a circuit, comprising the steps of:
    retrieving electrically said signals from a frequency generation (FG) output terminal;
    electrically-isolatively transmitting said signals in said circuit; and
    generating said signals electrifiably in order to output said signals.

13. The method as described in claim 12, wherein a photo coupler is used for electrically-isolative transmission of said circuit in said transmitting step.

14. The method as described in claim 13, wherein said photo coupler includes a light emitting diode (LED) and a phototransistor to respond to said LED.

15. The method as described in claim 12, wherein the frequency generation (FG) output terminal from which the signals are electrically retrieved is an output terminal of a driver circuit of a fan motor.

16. The method as described in claim 12, wherein said signals are output to a speed detection circuit of a fan motor in said generating step.

* * * * *

UNITED STATES PATENT AND TRADEMARK OFFICE
CERTIFICATE OF CORRECTION

PATENT NO. : 7,057,363 B2  Page 1 of 1
APPLICATION NO. : 11/069147
DATED : June 6, 2006
INVENTOR(S) : Chin-Long Ku It is certified that error appears in the above-identified patent and that said Letters Patent is hereby corrected as shown below:

Correction to Assignee under 37 CFR § 3.81(b)

On the cover page of the patent, please replace item (73) Assignee, as follows:

Assignee: ~~Hon Hai Precision Industry Co., Ltd. (TW)~~
<u>Foxconn Technology Co., Ltd. (TW)</u>

Signed and Sealed this

Nineteenth Day of September, 2006

JON W. DUDAS
*Director of the United States Patent and Trademark Office*